US008621068B2

(12) United States Patent  (10) Patent No.: US 8,621,068 B2
Zohar et al.  (45) Date of Patent: Dec. 31, 2013

(54) SYSTEM AND METHOD FOR MONITORING ADVERTISEMENT ASSIGNMENT

(75) Inventors: Meir Zohar, New Milford, NJ (US); Nitzan Ben-Zvi, Hogla (IL)

(73) Assignee: Exelate Media Ltd., Kfar Saba (IL)

( * ) Notice: Subject to any disclaimer, the term of this patent is extended or adjusted under 35 U.S.C. 154(b) by 451 days.

(21) Appl. No.: 12/859,691

(22) Filed: Aug. 19, 2010

(65) Prior Publication Data

US 2011/0072131 A1  Mar. 24, 2011

Related U.S. Application Data

(60) Provisional application No. 61/235,375, filed on Aug. 20, 2009.

(51) Int. Cl.
*G06F 15/173* (2006.01)

(52) U.S. Cl.
USPC .......................................... 709/224

(58) Field of Classification Search
USPC .......................................... 709/224
See application file for complete search history.

(56) References Cited

U.S. PATENT DOCUMENTS

| | | | |
|---|---|---|---|
| 5,848,396 A | 12/1998 | Gerace | |
| 5,948,061 A | 9/1999 | Merriman et al. | |
| 5,991,735 A | 11/1999 | Gerace | |
| 6,026,368 A | 2/2000 | Brown et al. | |
| 6,134,532 A | 10/2000 | Lazarus et al. | |
| 6,594,691 B1 | 7/2003 | McCollum et al. | |
| 6,662,215 B1 | 12/2003 | Moskowitz et al. | |
| 6,904,461 B1 * | 6/2005 | Randhava et al. | 709/224 |
| 6,925,440 B1 | 8/2005 | Shkedi | |
| 6,973,436 B1 | 12/2005 | Shkedi | |
| 6,983,379 B1 | 1/2006 | Spalink et al. | |
| 7,039,599 B2 | 5/2006 | Merriman et al. | |
| 7,062,510 B1 | 6/2006 | Eldering | |
| 7,072,853 B2 | 7/2006 | Shkedi | |
| 7,089,195 B2 | 8/2006 | Rosenberg | |
| 7,162,522 B2 | 1/2007 | Adar et al. | |
| 7,428,493 B2 | 9/2008 | Shkedi | |
| 7,454,364 B2 | 11/2008 | Shkedi | |
| 7,496,943 B1 | 2/2009 | Goldberg et al. | |
| 7,533,012 B2 | 5/2009 | Walsh et al. | |

(Continued)

OTHER PUBLICATIONS

"Nielsen Bridges Online and Offline Behaviors with Innovative Cross-Platform Offering," The Nielsen Company, 2012, Retrieved from the internet: Aug. 14, 2012, pp. 1-2.

(Continued)

*Primary Examiner* — Imad Hussain
(74) *Attorney, Agent, or Firm* — Venable LLP; Jeffri A. Kaminski; Christopher B. Tokarczyk

(57) ABSTRACT

A method is disclosed which emulates accessing web sites by a simulated web visitor. The characteristics of the web user may be controlled as may be the timing and number of visits and the nature of the web sites visited. During the emulated visits cookies of the web visitor are modified. The emulated visits may be directed to a sub-group of web sites which are engaged in agreements granting them reward for the provision of data indicative of the nature of past web visits, and to a sub-group of web sites which are not engaged in such agreements. Comparison of the exposure of the emulated web visitor to advertisements in each of the sub groups may be analyzed to indicate whether the agreements are properly executed and the reward is properly given.

14 Claims, 3 Drawing Sheets

(56) References Cited

U.S. PATENT DOCUMENTS

| | | | |
|---|---|---|---|
| 7,617,122 B2 | 11/2009 | Kumar et al. | |
| 7,991,800 B2 | 8/2011 | Lawrence et al. | |
| 8,019,777 B2 | 9/2011 | Hauser | |
| 8,024,323 B1 | 9/2011 | Nayfeh | |
| 8,027,879 B2 | 9/2011 | Ramer et al. | |
| 8,073,738 B2 | 12/2011 | Protheroe et al. | |
| 8,108,245 B1 | 1/2012 | Hosea et al. | |
| 8,234,166 B2 | 7/2012 | Filice et al. | |
| 8,296,643 B1* | 10/2012 | Vasilik | 715/200 |
| 8,321,273 B2* | 11/2012 | Briggs | 705/14.41 |
| 8,327,271 B2* | 12/2012 | Miller | 715/738 |
| 2002/0116258 A1* | 8/2002 | Stamatelatos et al. | 705/14 |
| 2003/0014304 A1* | 1/2003 | Calvert et al. | 705/14 |
| 2003/0033196 A1 | 2/2003 | Tomlin | |
| 2003/0036949 A1 | 2/2003 | Kaddeche et al. | |
| 2003/0088485 A1 | 5/2003 | Feinberg | |
| 2003/0135460 A1 | 7/2003 | Talegon | |
| 2003/0167212 A1 | 9/2003 | Monteverde | |
| 2004/0003036 A1 | 1/2004 | Eagle et al. | |
| 2004/0015397 A1 | 1/2004 | Barry et al. | |
| 2004/0024632 A1* | 2/2004 | Perry | 705/10 |
| 2004/0117460 A1* | 6/2004 | Walsh et al. | 709/219 |
| 2004/0117486 A1 | 6/2004 | Bourne et al. | |
| 2004/0199397 A1 | 10/2004 | Dresden | |
| 2005/0165643 A1 | 7/2005 | Wilson et al. | |
| 2005/0166233 A1 | 7/2005 | Beyda et al. | |
| 2005/0187818 A1 | 8/2005 | Zito et al. | |
| 2005/0193020 A1 | 9/2005 | Shkedi | |
| 2005/0222901 A1 | 10/2005 | Agarwal et al. | |
| 2005/0235030 A1 | 10/2005 | Lauckhart et al. | |
| 2005/0246736 A1 | 11/2005 | Beyda et al. | |
| 2006/0026061 A1 | 2/2006 | Collins | |
| 2006/0041562 A1 | 2/2006 | Paczkowski et al. | |
| 2006/0059042 A1* | 3/2006 | Zohar | 705/14 |
| 2006/0212349 A1 | 9/2006 | Brady | |
| 2006/0212350 A1 | 9/2006 | Ellis et al. | |
| 2006/0242267 A1 | 10/2006 | Grossman | |
| 2006/0282328 A1 | 12/2006 | Gerace et al. | |
| 2007/0022009 A1 | 1/2007 | Cataldi et al. | |
| 2007/0061195 A1 | 3/2007 | Liu et al. | |
| 2007/0067215 A1 | 3/2007 | Agarwal et al. | |
| 2007/0088609 A1 | 4/2007 | Reller et al. | |
| 2007/0168506 A1 | 7/2007 | Douglas et al. | |
| 2007/0294401 A1 | 12/2007 | Shkedi | |
| 2008/0010155 A1 | 1/2008 | Shkedi | |
| 2008/0040175 A1* | 2/2008 | Dellovo | 705/7 |
| 2008/0140479 A1* | 6/2008 | Mello et al. | 705/7 |
| 2008/0183561 A1 | 7/2008 | Zohar et al. | |
| 2008/0195462 A1 | 8/2008 | Magdon-Ismail et al. | |
| 2008/0209037 A1 | 8/2008 | Zernik et al. | |
| 2008/0243531 A1 | 10/2008 | Hyder et al. | |
| 2008/0243592 A1* | 10/2008 | Song et al. | 705/10 |
| 2008/0263627 A1 | 10/2008 | Berteau et al. | |
| 2008/0275980 A1* | 11/2008 | Hansen | 709/224 |
| 2009/0006363 A1 | 1/2009 | Canny et al. | |
| 2009/0024546 A1 | 1/2009 | Ficcaglia et al. | |
| 2009/0055332 A1 | 2/2009 | Lee | |
| 2009/0063250 A1 | 3/2009 | Burgess et al. | |
| 2009/0063268 A1 | 3/2009 | Burgess et al. | |
| 2009/0106296 A1 | 4/2009 | Sickmiller et al. | |
| 2009/0125398 A1* | 5/2009 | Cochran et al. | 705/14 |
| 2009/0150126 A1 | 6/2009 | Sellamanickam et al. | |
| 2010/0082507 A1 | 4/2010 | Ganapathi et al. | |
| 2010/0082808 A1 | 4/2010 | Vaynblat et al. | |
| 2010/0088177 A1 | 4/2010 | Lu et al. | |
| 2010/0100415 A1 | 4/2010 | Plummer et al. | |
| 2010/0179855 A1 | 7/2010 | Chen et al. | |
| 2010/0228595 A1 | 9/2010 | Dempster et al. | |
| 2010/0241510 A1* | 9/2010 | Zhang | 705/14.45 |
| 2010/0332426 A1 | 12/2010 | Van Bemmel | |
| 2011/0125587 A1* | 5/2011 | Netzer et al. | 705/14.68 |
| 2011/0131099 A1 | 6/2011 | Shields et al. | |
| 2011/0166927 A1 | 7/2011 | Bandi et al. | |
| 2011/0173063 A1 | 7/2011 | Bhatia et al. | |
| 2011/0173071 A1 | 7/2011 | Meyer et al. | |
| 2011/0187717 A1 | 8/2011 | Jagannath et al. | |
| 2011/0191169 A1 | 8/2011 | Cui et al. | |
| 2011/0191170 A1 | 8/2011 | Zhang et al. | |
| 2011/0191191 A1 | 8/2011 | Bax et al. | |
| 2011/0208591 A1 | 8/2011 | Chen et al. | |
| 2011/0218866 A1 | 9/2011 | Wilson | |
| 2011/0231242 A1 | 9/2011 | Dilling et al. | |
| 2011/0231244 A1 | 9/2011 | Bhatia et al. | |
| 2011/0231245 A1 | 9/2011 | Bhatia et al. | |
| 2011/0231246 A1 | 9/2011 | Bhatia et al. | |
| 2011/0231253 A1 | 9/2011 | Crawford et al. | |
| 2011/0238468 A1 | 9/2011 | Shen et al. | |
| 2011/0246285 A1 | 10/2011 | Ratnaparkhi et al. | |
| 2011/0258052 A1 | 10/2011 | Kakade et al. | |
| 2011/0258054 A1 | 10/2011 | Pandey et al. | |
| 2011/0270670 A1 | 11/2011 | Leathern | |
| 2011/0270686 A1 | 11/2011 | Patwa et al. | |
| 2011/0276391 A1 | 11/2011 | Hillard et al. | |
| 2011/0282732 A1 | 11/2011 | Bax et al. | |
| 2011/0282815 A1 | 11/2011 | Thomas | |
| 2011/0310891 A1 | 12/2011 | Howe et al. | |
| 2012/0004979 A1 | 1/2012 | Bhatia et al. | |
| 2012/0004980 A1 | 1/2012 | Bhatia et al. | |
| 2012/0004981 A1 | 1/2012 | Bhatia et al. | |
| 2012/0010942 A1 | 1/2012 | Bax et al. | |
| 2012/0022952 A1 | 1/2012 | Cetin et al. | |
| 2012/0023043 A1 | 1/2012 | Cetin et al. | |
| 2012/0036007 A1 | 2/2012 | Robertson et al. | |
| 2012/0036008 A1 | 2/2012 | Robertson et al. | |
| 2012/0066072 A1 | 3/2012 | Kanigsberg et al. | |
| 2012/0078705 A1 | 3/2012 | Megdal | |
| 2012/0078709 A1 | 3/2012 | Dunham et al. | |
| 2012/0078711 A1 | 3/2012 | Mehta et al. | |
| 2012/0084149 A1 | 4/2012 | Gaudiano et al. | |
| 2012/0095845 A1 | 4/2012 | Shani | |
| 2012/0095848 A1 | 4/2012 | Chan | |
| 2012/0095985 A1 | 4/2012 | Shen et al. | |
| 2012/0109745 A1 | 5/2012 | Bhamidipati | |
| 2012/0116885 A1 | 5/2012 | Krishnamoorthy | |
| 2012/0123851 A1 | 5/2012 | Bax et al. | |
| 2012/0123859 A1 | 5/2012 | Gupta | |
| 2012/0123863 A1 | 5/2012 | Kaul et al. | |
| 2012/0150641 A1 | 6/2012 | Dobbs et al. | |
| 2012/0166272 A1 | 6/2012 | Wiley et al. | |
| 2012/0166520 A1* | 6/2012 | Lindsay et al. | 709/203 |
| 2012/0173326 A1 | 7/2012 | Tao et al. | |
| 2012/0191528 A1 | 7/2012 | Bax et al. | |
| 2012/0203642 A1 | 8/2012 | Park et al. | |
| 2012/0253928 A1 | 10/2012 | Jackson et al. | |
| 2012/0278158 A1 | 11/2012 | Farahat | |
| 2012/0290403 A1 | 11/2012 | Galitzky et al. | |

OTHER PUBLICATIONS

"Online Advertising," Fresh Patents.com, Retrieved from the internet: Nov. 20, 2012, pp. 1-2, http://tgs.freshpatents.com/Online-Advertising-bx1.phphttp://tgs.freshpatents.com/Online-Advertising-bx1.php , retrieved on Nov. 20, 2012.

LaRue, "eXelate, Nielsen Catalina Solutions Partner to Bring CPG Data Online," Adotas, Jan. 31, 2012, Retrieved from the internet: Aug. 14, 2012, pp. 1-2.

Lykou et al., "Sparse CCA using a Lasso with positivity constraints," Computational Statistics and Data Analysis, 2010 vol. 54, pp. 3144-3157.

Soltani et al., "Flash Cookies and Privacy," 2009, Summer Undergraduate Program in Engineering Research at Berkeley (SUPERB), pp. 158-163.

Stage et al., "Measuring Similarity in Nearest Neighbor Imputation: Some New Alternatives," Proceedings of the Symposium on Statistics and Information technology in Forestry, 2003, pp. 1-6

Witten et al., "A penalized matrix decomposition, with applications to sparse principal components and canonical correlation analysis," Biostatistics, 2009, vol. 10, No. 3, pp. 515-534.

* cited by examiner

SYSTEM AND METHOD FOR MONITORING ADVERTISEMENT ASSIGNMENT

CROSS REFERENCE TO RELATED APPLICATIONS

This Application claims the benefit of U.S. Provisional Application Ser. No. 61/235,375, filed Aug. 20, 2009, which is hereby incorporated by reference in its entirety.

BACKGROUND OF THE INVENTION

Web sites in a wide area network, such as the Internet, which offer merchandise and/or services are visited by net surfers (herein after visitors) looking for the merchandise or service offered by these sites. The mere fact that a certain visitor has visited a certain web site constitutes information characterizing the visitor with respect to the merchandise or service offered by the visited web site. The visited web site may instruct the visitor's surfing program, such as a WEB browser, to store indication of this information in the visitor's computer or other platform used by the visitor, for example by 'planting' a cookie or cookies on storage means of the visitor's computer. This characterizing information is valuable for advertisers, who may target their advertisement better using this user's characterizing information. Thus, this valuable information, or data may be traded between a visited web site, herein after a data provider, and advertiser or advertisers who wish to rely on this data for targeted advertising. Similarly advertising network or networks and advertising agencies may be interested in such data. Advertisers and advertising networks and agencies will be referred to herein after as data buyers.

Several schemes may be used for rewarding a data provider for the data he provides. Such schemes may correlate this reward, or profit, to the number of visitors who access the data provider site, the number of visitors that request advertisement content after visiting the data provider's sites or the actual number of clicks that those visitors clicked on advertisements they were exposed to, etc. The term 'click' herein after may refer to any action taken by a user while responding to an optional content within an Internet page (as provided by the data buyer) or to activate an optional action in an Internet page (that was displayed to the visitor as result), or the like. Further, advertising campaigns relying on this data may use one or more of several schemes such as the number of times an advertisement is to be presented in a certain web site during a defined period of time; the blend of a certain advertisement within other advertisements which is presented in a certain web site to a certain user, etc.

Further, a data provider may be interested in ensuring that data provided by him is not used against his business interests, for example by presenting advertisements of business competitors in response to data provided by him. A list of entities that are considered such competitors is usually denoted as a "black-list".

Considering the above, a data provider may find it rather complicated to verify the fulfillment of the agreement, or contract, he has with the data buyer in two aspects. First, if he is properly rewarded for the data he provided to a data buyer. The difficulties to verify a proper reward to a data provider may be due to the fact that the parameters used for calculating the reward are usually not available to a data provider. Second, in cases where the data provider has asserted 'negative conditions' for the use of the data provided by him, for example, preventing the use of such data to invoke advertisements of his or her competitors (defined as part of the 'black list' as described above). There is a need for tools that will enable verifying or evaluating the above

SUMMARY OF THE INVENTION

According to embodiment of the present invention a method is disclosed comprising emulating by a monitor service a network user accessing a first Internet web site belonging to a first group of web sites, said accessing invoking recordal of a tag in said emulated network user, said tag to indicate history of accessing into web sites of certain character, said Internet web site is associated with said certain character; emulating by said monitor service said network user accessing a second Internet web site belonging to a second group of web sites and, said second Internet web site presenting advertising content, said advertising content provided by an advertisements providing service, and recording the received advertisements content and associated meta data and saving said received advertisements content as a first advertisement exposure indicator; emulating by said monitor service a second network user accessing an Internet web site belonging to said second group of web sites, said second Internet web site presenting advertising content, said advertising content provided by said advertisements providing service and recording the received advertisements content and meta data and saving said received advertisements content as a second advertisement exposure indicator; analyzing said first advertisement exposure indicator and said second advertisement exposure indicator, and issuing indication of the effect of said tagging on the difference between said first advertisement exposure indicator and said second advertisement exposure indicator based on said analyzing and on a predefined alert policy.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
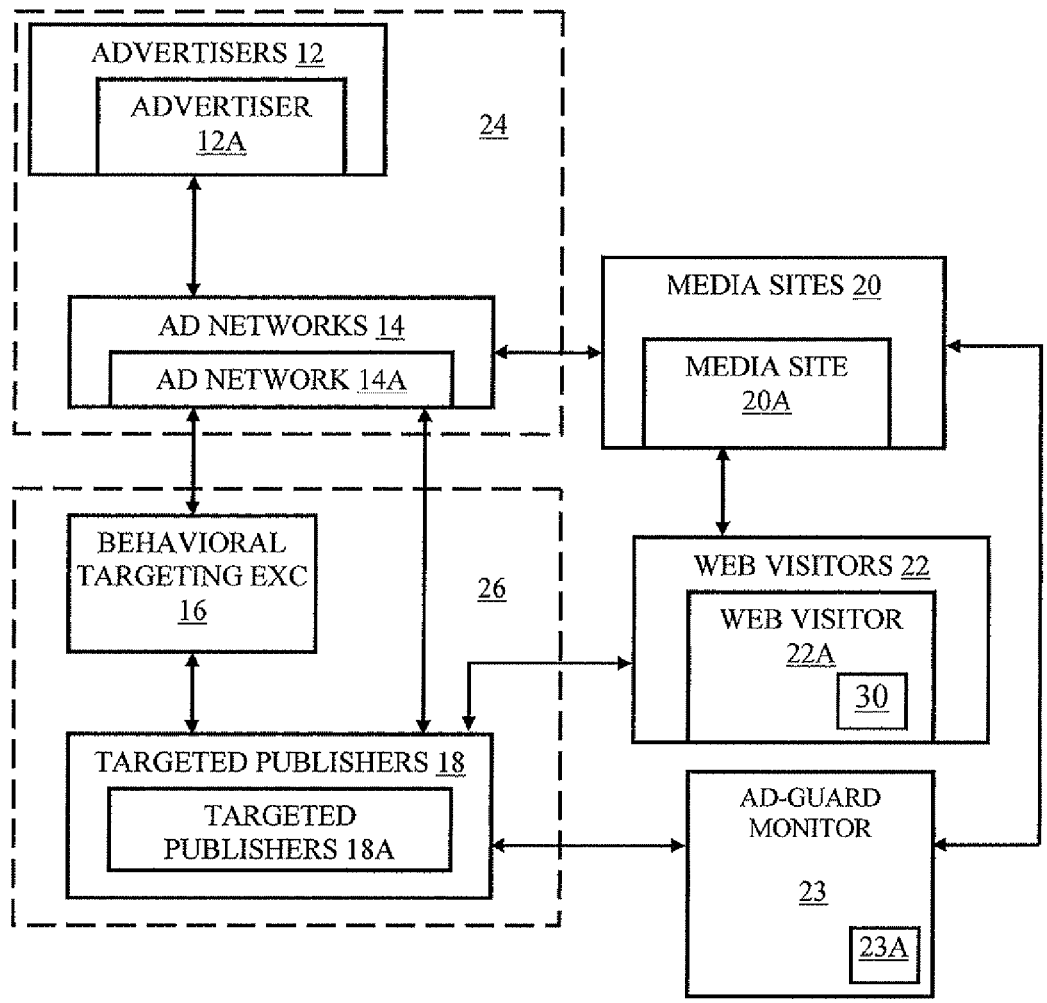
FIG. 1 is a schematic block diagram of a system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is made now to FIG. 1, which is a schematic block diagram of system 10 according to embodiments of the present invention. System 10 comprises data providers group 26 which may comprise targeted publishers group 18 and behavioral targeting exchange module 16. Targeted publishers group 18 comprises plurality of targeted publishers 18A, 18B (not shown), etc. Targeted publishers, such as targeted publishers 18A, 18B, are web sites that have been, or are interested to be engaged in a contract to allow use of data classifying of web visitors who visited these sites by data buyers, such as advertisers 12 and ad networks 14. System 10 further comprises data buyers group 24 which may comprise advertisers group 12 which comprises one or more advertisers 12A, 12B (not shown) etc., advertising networks 14 which comprises a plurality of advertising networks 14A, 14B (not shown) etc., and advertising agencies (not shown). System 10 further comprises web visitors group 22 which comprises a plurality of web visitors 22A, 228 (not shown) etc. A web visitor is a network user using a web browser running on computer (or the like) and able to surf, or enter, web sites, such as media sites 20. A web visitor's computer is equipped with storage means, such as hard disk, Flash memory device and the like. Data may be saved on this storage means, for example temporary or permanent data, programs and Internet cookies. System 10 further comprises web media sites group 20 which comprises a plurality of web media sites 20A, 20B (not shown), etc. Web visitors 22A, 22B etc. may visit one or more of media sites 20A, 20B etc. it will be noted that targeted publishers 18A, 18B may have, in some embodiments, all the features of media sites 20A, 20B and in further embodiments targeted publishers 18A, 18B may be a sub-group of media sites group 20.

Targeted publisher 18A, 18B is engaged in a contract with at least one data buyer. Such contracting engagement may be embodied via a third party, such as behavioral targeting exchange module 16. According to the contract, targeted publisher 18A, 1813 enable writing data in cookie or cookies saved on the storage means of a web visitor, such as web visitors 22A, 22B. A network user, such as web visitor 22A, 2213, whose cookies are written or modified as a result of a visit to targeted publisher 18A, 18B, will be denoted herein after as a "tagged user". The data written in these cookies may indicate data such as: that this visitor has visited that web site once or more; whether this visit establishes compliance with one or more behavioral classifications as dictated by the details of the contract, etc. It will be noted that when targeted publisher 18A, 18B is engaged with more than one data buyer, the cookies for each data buyer are modified separately, according to parameters, data format and other features that may be dictated by each data buyer. Thus, a classifying cookie for one data buyer may include indications of first group of trends, behavioral characteristics and possibly history of previous visits while a classifying cookie or cookies of a second data buyer may include indications of a second group of classifying characteristics.

In some embodiments the execution of policy with respect to how cookies of a web visitor should be modified per a visit of a certain web visitor in a certain media site so that the required classifications are indicated in information stored in the cookies may be done by a software program that may be installed and running under the control of behavioral targeting exchange module 16. Behavioral targeting exchange module 16 is in active communication with ad networks 14A, 14B and targeted publishers 18A, 18B, so as to ensure that the information written in cookies of a web visitor upon any visit to any one of targeted publishers 18A, 18B, etc. reflects the respective requirements and definitions set in a contract that was signed between the respective targeted publisher and the respective advertising network.

As seen in FIG. 1, web visitor 22A, 22B may be in active communication with, and may visit targeted publisher 18A, 18B. Similarly, web visitor 22A, 22B is in active communication with, and may visit media site 20A, 20B. Further, media sites group 20 is in active communication with ad networks group 14. A visit of web visitor 22A, 22B to targeted publisher 18A, 18B may invoke writing new cookie or cookies, or modifying existing cookie or cookies in the storage means of web visitor 22A, 22B. Visit of web visitor 22A, 22B to media site 20A, 20B, will invoke loading of a requested web page and, when that web page includes instructions for loading of advertisement or advertisements that are provided by ad networks 14A, 14B. Ad network 14A, 14B may implement targeted advertising policy that reflects contracts it has with advertisers 12A, 12B. For implementing this policy cookies of web visitor 22A, 22B are browsed by ad networks 14A, 14B and according to the information and classifications in them and further according to advertising contract signed with data provider 26, ad networks 14A, 14B sends selected advertisements to the web visitor 22A, 22B. It will be noted that other cookies, inventories and considerations may affect the advertisement content being presented to the user.

The profit that a targeted publisher may expect is subject to the values of several parameters such as number of visitors marked as visited in a web site (web visitor 22A, 22B browsed into the web site of targeted publisher 18A, 18B); number of entrances (visits) to web site 20A, 20B by a web visitor which previously visited targeted publisher 18A, 18B; of those— number of visitors which responded to advertising content (e.g. by clicking a certain advertisement content); and of those—visitors which actively used provided services of that web site such as purchased service or goods, registered to a service or list, and the like, etc.

Targeted publisher 18A, 18B may have interest in knowing whether the profit he receives correlates to the actual value of the data he provided, according to the respective contract. Targeted publisher 18A, 18B may further have interest in knowing that contractual definitions relating to advertisement presentation are followed, such as advertisements defined as not-to-be-presented are actually not presented, proper advertisements blending is used. However, since this data is not available to targeted publisher 18, method and system for otherwise verifying it need to be established.

System 10 further comprising ad-guard monitor service 23 which comprises storage means 23A, where cookies may be written, stored, modified and read. Ad-guard monitor service 23 may be embodied as a program running on a dedicated computer, or on a computer running also other programs, or on a server or servers connected to system 10, or the like. Ad-guard monitor service 23 is in active communication with targeted publishers 18A, 18B and with media sites 20A, 20B. Ad-guard monitor service 23 is adapted to simulate web visitors 22A, 22B by appearing in system 10 as a certain web visitor at any given time. Ad-guard monitor service 23 is adapted to emulate said certain web visitor using different characterizing situations of said certain web visitor, such as web visitor 22A, 22B who visited media site 20A, 20B without previously visiting targeted publisher 18A, 18B, after visiting targeted publisher 18A, 18B one time, after visiting targeted publisher 18A, 18B two times, etc. Emulation of a web visitor visiting targeted publisher 18A, 1813 a variable number of times before ad-guard service 23 emulates a visit to media site 20A, 20B may effect the content of a cookie indicative of the history of visits of said web visitor and thus effect analyses of said emulated visits, as is discussed in details below. Ad-guard monitor service 23 may emulate one of a plurality of web visitors, as may be required. Ad-guard monitor service 23 is further adapted to invoke controlled visits to monitored targeted publishers 18A, 18B and to a controlled list of media sites 20A, 20B. Said controlled visits to monitored targeted publishers 18A, 18B and the list of media sites 20A, 20B may be in a controlled order. Further, the time frame within which the emulated visits of web visitor 22A, 22B to media sites 20A, 20B in the various configurations relative to visiting targeted publisher 18A, 18B described above, and the controlled list of media sites 20A, 20B. Said controlled visits to monitored targeted publishers 18A, 18B and the list of media sites 20A, 20B are performed may be controlled, for example to have a definable value. It would be appreciated by those skilled in the art that the characteristics of this time frame may have an implication on the meaning of tests performed according to embodiments of the present invention, as will be described in more details below. Ad-guard monitor service 23 is further adapted to collect and analyze advertisement related information received during browsing into media site 20A, 20B.

Targeted publisher 18A, 18B may define a set of tests to check and verify the fulfillment of the contract signed with ad networks 14A, 14B. Those tests will check whether the reward he receives correlates to the actual value of the data he provided, according to the respective contract and further whether the contractual definitions relating to advertisement presentation are followed (including content blending aspects, black-list limitation and so). Those tests may be performed by invoking a plurality of web visitors' accessing targeted publishers 18A, 18B and media sites 20A, 20B, according to sets of test parameters. These test parameters may include geographical related information (such as origin country, simulated by using IP address belonging to the simulated origin country), time-of-day, day-of-week, number of visits to be emulated in targeted and in non-targeted publishers, scheduling of the visits—how often and when, flow of the order of visits (e.g. whether the emulated visitor previously visited targeted publisher site once or more, and how often, etc.), the type of browser and the like.

Testing scenario will be defined as a set of testing parameters having each a certain value. Testing scenario may include one or more visits to targeted publishers 18A, 1813 and/or media sites 20A, 20B. Thus, two different testing scenarios may differ from each other by having at least one parameter with different value in each. Testing session will be defined as a set of testing scenarios performed with a certain set of parameters. A single test will include one or more test sessions with optionally with varying parameter values.

Figure 2:
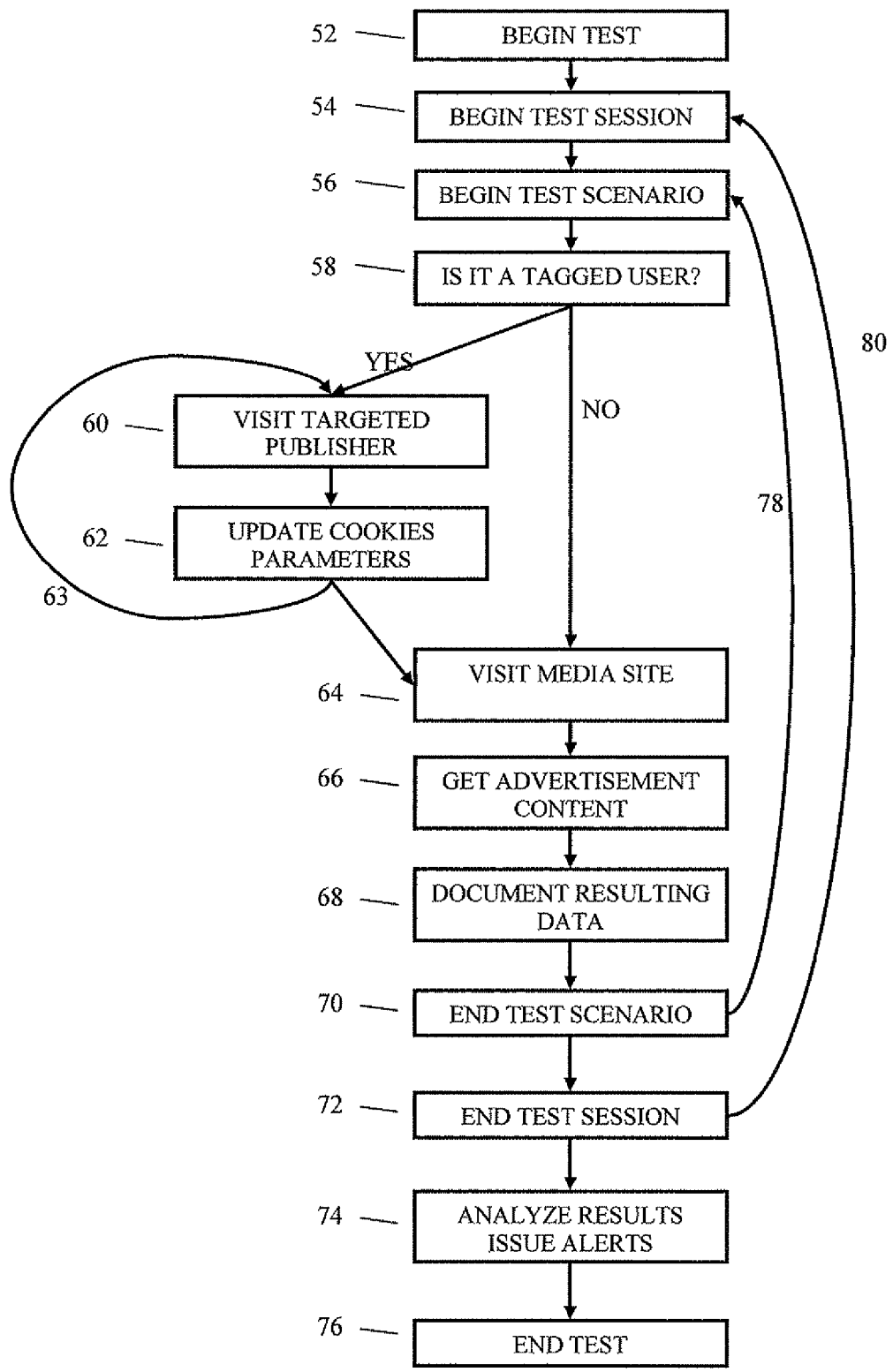
FIG. 2, is a schematic flow diagram depicting verification of effect of advertising contract according to embodiments of the present invention.

Reference is made now also to FIG. 2, which is a schematic flow diagram depicting a test process according to embodiments of the present invention. According to embodiments of the present invention system 10 may perform tests to check whether the profit a targeted publisher receives correlates to the actual value of the data he provided, according to the respective contract and further whether the contractual definitions relating to advertisement presentation are followed. The test begins (block 52) with loading the entire set of test parameters as defined in advance by the user and entering a test session. Each test session of the test begins (block 54) with preparing the parameters for the test session and entering a test scenario (block 56). Each test scenario begins with verifying whether the scenario emulates a tagged user which is a user that is accessing media site 20A, 20B and that previously accessed targeted publisher 18A, 18B (block 58).

If the user is a tagged user the test will emulate a call to targeted publisher 18A, 18B (block 60) and then update the cookies parameters saved on the local storage media of the user (block 62). The process of blocks 60-62 may be repeated as may be required according to the parameters of the current test session (63). The repetition of blocks 60-62 may be suspended to a specified period of time according to the test scenario specifications. For example, emulation of a tagged user that accesses a targeted publisher site a week after the previous visit. It will be noted that when such a process is suspended other processes of the test may independently continue or start.

Once the process of blocks 60-62 is over or if the scenario does not emulate a tagged user, system 10 emulates a call to media site 20A, 20B (block 64) and gets advertisements content result of that call (block 66). The resulting received advertisement content is documented (block 68). Documentation of the resulting advertisements data, referred herein after "meta data", includes recordation of the list of redirection links that leads to visual content that will be displayed to the user and the list of the redirection links that will occur once the emulator will emulate a user's click on that content. Documentation may further include recordation of the visual content itself When the test scenario is done (block 70) if other scenarios are to be performed on this session the next (78) test scenario will begin (block 56).

Otherwise, if other test sessions are to be performed on this test the next (80) test session will begin (block 54).

Otherwise, ad-guard monitor service 23 will start analyzing (block 74) the collected data as documented during the entire test (block 68). During the analysis process, the monitor will compare the advertisement content displayed to the user in the different scenarios and sessions. Analyzing of the results will begin with association of advertisements with respective advertisers and campaigns. Received advertisements will be surveyed and based on the survey will be grouped per each campaign. The survey may be performed automatically and/or manually by a user. For example automatic grouping may be performed by binary comparison of the visual content data and/or by analyzing the associated link(s) and/or by using automated graphical comparison tools. Additionally or alternatively system 10 may allow the user to manually define and group content into campaigns. Once the grouping into campaigns is done, ad-guard monitor service 23 may conclude one or more of the following conclusions.

A first conclusion may evaluate the effect of the tagging of users accessing media sites 20A, 20B. For example, when the differences between the resulting campaigns relating to scenarios of tagged and non-tagged users (made within the same timeframe) yield in a very low significance value it may indicate a problem in usage of the purchased data or a low relevance inventory of advertisements. Another example is when the frequency of displaying targeted content to a user exceeds a defined limit. Yet another example is when the total number of targeted content displayed to a user within a defined period of time exceeds a defined limit, defined as over use of advertisements. In such case, based on the user definitions, ad-guard monitor service 23 may issue an alert to this effect.

A second conclusion may indicate the repetition scheme of advertisement content to the tagged user. For example, exposing of a tagged user to too high percentage of targeted content, in excess of the allowed exposure scheme, as defined by the user. In such case, based on the user definitions, ad-guard monitor service 23 may issue an alert to this effect.

A third conclusion may indicate that advertisement content leads or associated with media site that was defined in the black-list. This may be done by analyzing each one of the URLs (Uniform Resource Locator) links resulting from the click on the advertisement content, and parsing the URLs contained in them, that are associated with sites on the black-list. In such case, based on the user definitions, ad-guard monitor service 23 may issue an alert to this effect.

A fourth conclusion may indicate relative exposures and volumes amongst different campaigns. This information may be used to evaluate the volumes of users exposed to advertisement content and missing income from certain campaigns as compared to reported campaigns. In such case, based on the user definitions, ad-guard monitor service 23 may issue an alert to this effect.

Figure 3:
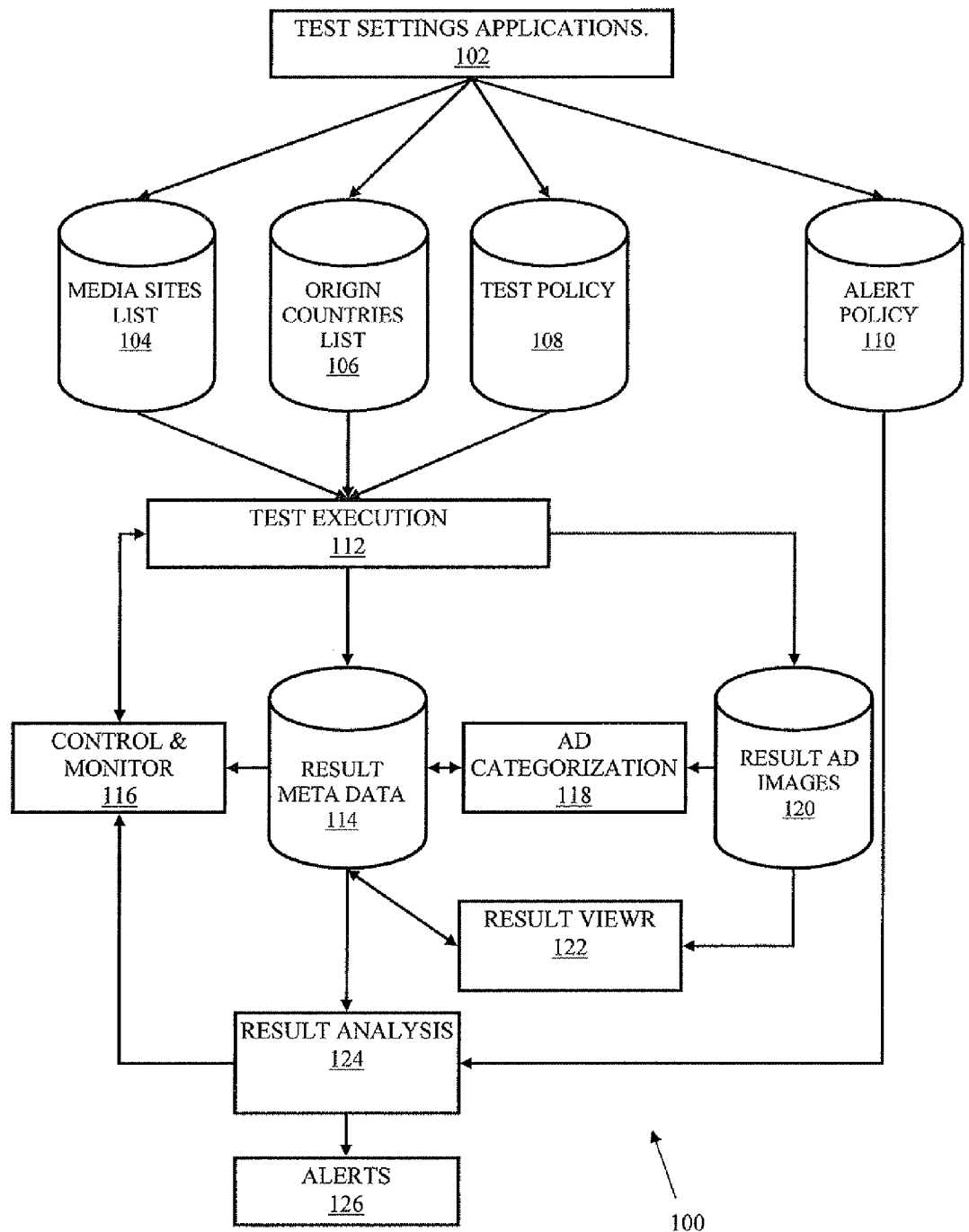
FIG. 3 is a schematic block diagram illustrating a sub-system being an optional embodiment of ad-guard monitor according to embodiments of the present invention.

Reference is made now to FIG. 3, which is a schematic block diagram illustrating sub-system 100 being an optional embodiment of ad-guard monitor service 23 of the present invention. Sub-system comprising 100 test setting application 102 allowing the user to define or set one or more tests that will be used to monitor the advertisement assignment related to a certain targeted publisher 18A, 18B. When using test setting application 102 a user may define the following parameters. A first set of parameter may include settings related to the publisher itself. For example, set of links to be used while emulating visiting targeted publisher site (block 60). A second set of parameters may include a list of origin countries that will be used during the emulation. A third set of parameters may include the list of media sites that will be used during the testing sessions and scenarios, for example, the web site of CNN ®, of Amazon ®, etc.. A fourth set of parameters may include session and scenario related parameters that will be used during the test, for example time-of-day, day-in-week and actual time of performance of the test, etc. The fifth set of parameters may include the definition of the alert boundaries that will be used to trigger an alert to the user on exceeding certain limitation during the analysis stage and alerting messaging policy—who should be alerted, via what alerting channel (such as short messaging system (SMS), email etc.), etc. For example—if the blending ratio of the advertisement content provided to tagged users and to non-tagged users is less than 10%. Setting information and definitions may stored in storage mediums such as media site list 104, origin countries list 106, test policy 108 and alert policy 110, and the like.

Test execution module 112 establishes and executes test sessions and test scenarios, as detailed above with respect to FIG. 2, from block 52 to block 72. As part of its operation, test execution module 112 stores the collected advertisement content (as described in block 68) in result ad image 120 and result meta data 114. It will be noted that module 112 may execute multiple tests, test scenarios and test sessions in parallel.

Ad-categorization module 118 is adapted to automatically group advertisements content stored in result ad images 120 into common campaign definition and store this information on result meta data 114, as partially described with respect to block 74 of FIG. 2. Grouping of the advertisements content may also be carried out manually by the user using the result viewer 122. In additional, result viewer 122 allows the user to review and manually modify grouping resulting from the automated process of ad categorization module 118. Ad categorization module 118 will comply with categorizations made by the user using result viewer 122.

Result analysis module 124 analyzes the test execution results as defined in block 74 of FIG. 2. Result analysis module 124 compares the result data with the definitions of alert policy 110 and issues alerts accordingly.

Alerts module 126 dispatches the alerts to the user as defined in alert policy 110.

Control and monitor module 116 allows the user monitor and control the execution of the tests including stopping or suspending the test process, monitoring of the actual execution of the test process, view issued alerts and initiate an on-demand tests. Additionally monitor module 116 enables the user to view the accumulating results, the statistical analysis of same and the probability of a certain advertisement campaign to be presented to a user having certain characteristics.

The various functionalities and operations of the modules of sub-system 100 may be executed on one or more computers or servers which may be located in different physical locations which may be spaced apart. Similarly, the storage of the various data entities may be on one or more storage mediums using one or more computers or servers, which may be located in different physical locations and may be spaced apart.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
(a) emulating by a monitor service a network user accessing a first Internet web site belonging to a first group of web sites, said accessing invoking recordal of a tag in said emulated network user, said tag to indicate history of accessing into web sites of certain character, said Internet web site is associated with said certain character;
(b) emulating by said monitor service said network user accessing a second Internet web site belonging to a second group of web sites and, said second Internet web site presenting advertising content, said advertising content provided by an advertisements providing service, and recording the received advertisements content and associated meta data and saving said received advertisements content as a first advertisement exposure indicator;
(c) emulating by said monitor service a second network user accessing a third Internet web site belonging to the first group of web sites, said accessing invoking recordal of said tag in said emulated network user;
(d) emulating by said monitor service said second network user accessing a fourth Internet web site belonging to said second group of web sites, said fourth Internet web site presenting advertising content, said advertising content provided by said advertisements providing service, and recording the received advertisements content and associated meta data and saving said received advertisements content as a second advertisement exposure indicator;
(e) emulating by said monitor service a third network user without the tag accessing an Internet web site belonging to said second group of web sites, said second Internet web site presenting advertising content, said advertising content provided by said advertisements providing service and recording the received advertisements content and meta data and saving said received advertisements content as a third advertisement exposure indicator;

(f) analyzing said first advertisement exposure indicator, said second advertisement exposure indicator, and said third advertisement exposure indicator, and (g) issuing indication of the effect of said tagging of the network user and the second network user but not of the third network user on the difference between said first advertisement exposure indicator, said second advertisement exposure indicator, and said third advertisement exposure indicator based on said analyzing and on a predefined alert policy.

2. The method of claim 1, wherein at least one step of a list containing step (a), step (b), step (c), step (d), and step (e) is repeated more than one time.

3. The method of claim 1, wherein steps (a)-(e) are repeated more than one time.

4. The method of claim 1, wherein the time between repetitions and between steps is definable.

5. The method of claim 1, wherein said emulating comprises emulating one or more of the features in the list containing origin country, time-of-day, day-in-week, type of emulated browser.

6. The method of claim 1, wherein said indication of said effect of said tagging on the difference between said first advertisement exposure indicator, said second advertisement exposure indicator, and said third advertisement exposure indicator based on said analyzing is indicative of the frequency of presenting of advertisements exceeds a defined limit.

7. A non-transitory computer readable medium comprising a computer executable program that when executed performs:

(a) emulating by a monitor service a network user accessing a first Internet web site belonging to a first group of web sites, said accessing invoking recordal of a tag in said emulated network user, said tag to indicate history of accessing into web sites of certain character, said Internet web site is associated with said certain character;

(b) emulating by said monitor service said network user accessing a second Internet web site belonging to a second group of web sites and, said second Internet web site presenting advertising content, said advertising content provided by an advertisements providing service, and recording the received advertisements content and saving said received advertisements content and associated meta data as a first advertisement exposure indicator;

(c) emulating by said monitor service a second network user accessing a third Internet web site belonging to the first group of web sites, said accessing invoking recordal of said tag in said emulated network user;

(d) emulating by said monitor service said second network user accessing a fourth Internet web site belonging to said second group of web sites, said fourth Internet web site presenting advertising content, said advertising content provided by said advertisements providing service, and recording the received advertisements content and associated meta data and saving said received advertisements content as a second advertisement exposure indicator;

(e) emulating by said monitor service a third network user without the tag accessing an Internet web site belonging to said second group of web sites, said second Internet web site presenting advertising content, said advertising content provided by said advertisements providing service and recording the received advertisements content and saving said received advertisements content as a third advertisement exposure indicator;

(f) analyzing said first advertisement exposure indicator, said second advertisement exposure indicator, and said third advertisement exposure indicator, and (e) issuing indication of the effect of said tagging of the network user and the second network user but not of the third network user on the difference between said first advertisement exposure indicator, said second advertisement exposure indicator, and said third advertisement exposure indicator based on said analyzing.

8. The non-transitory computer readable medium of claim 7, wherein at least one step of a list containing step (a), step (b), step (c), step (d), and step (e) is repeated more than one time.

9. The non-transitory computer readable medium of claim 7, wherein steps (a)-(e) are repeated more than one time.

10. The method of claim 1, wherein said indication of said effect of said tagging on the difference between said first advertisement exposure indicator, said second advertisement exposure indicator, and said third advertisement exposure indicator based on said analyzing is indicative of the tagging was not used as expected.

11. The method of claim 1, wherein said indication of said effect of said tagging on the difference between said first advertisement exposure indicator, said second advertisement exposure indicator, and said third advertisement exposure indicator based on said analyzing is indicative of the tagging was overused.

12. The method of claim 1, wherein said indication of said effect of said tagging on the difference between said first advertisement exposure indicator, said second advertisement exposure indicator, and said third advertisement exposure indicator based on said analyzing is indicative of the expected income based on said tagging is different from the actual income.

13. The method of claim 1, wherein said indication of said effect of said tagging on the difference between said first advertisement exposure indicator, said second advertisement exposure indicator, and said third advertisement exposure indicator based on said analyzing is indicative of the tagging was used for presenting unauthorized content.

14. A method comprising:

(a) emulating by a monitor service a network user accessing a first Internet web site belonging to a first group of web sites, said accessing invoking recordal of a tag in said emulated network user, said tag to indicate history of accessing into web sites of certain character, said Internet web site is associated with said certain character;

(b) emulating by said monitor service said network user accessing a second Internet web site belonging to a second group of web sites and, said second Internet web site presenting advertising content, said advertising content provided by an advertisements providing service, and recording the received advertisements content and associated meta data and saving said received advertisements content as a first advertisement exposure indicator;

(c) emulating by said monitor service a second network user without the tag accessing an Internet web site belonging to said second group of web sites, said second Internet web site presenting advertising content, said advertising content provided by said advertisements providing service and recording the received advertisements content and meta data and saving said received advertisements content as a second advertisement exposure indicator;

(d) analyzing said first advertisement exposure indicator and said second advertisement exposure indicator, and
(e) issuing indication of the effect of said tagging of the network user but not of the second network user on the difference between said first advertisement exposure indicator and said second advertisement exposure indicator based on said analyzing and on a predefined alert policy, wherein the indication of said effect of said tagging on the difference between said first advertisement exposure indicator and said second advertisement exposure indicator based on said analyzing is indicative of at least one of: the tagging was not used as expected, the expected income based on the tagging is different from the actual income, or the tagging was used for presenting unauthorized content.

* * * * *